Nov. 19, 1929.　　　E. R. WOLFERT　　　1,736,477

REGULATOR SYSTEM

Filed Feb. 17, 1928

INVENTOR
Edward R. Wolfert.
BY
ATTORNEY

Patented Nov. 19, 1929

1,736,477

UNITED STATES PATENT OFFICE

EDWARD R. WOLFERT, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed February 17, 1928. Serial No. 254,984.

My invention relates to systems of power transmission and particularly to means for regulating the voltage of a power-transmission system comprising a distribution circuit, a source of alternating current and a plurality of feeder circuits connected between said source and said distribution circuit.

In systems of the kind referred to, it is desirable to maintain the voltage of the distribution circuit constant at some predetermined point, irrespective of the loads connected to such circuit, and, in order to obtain this result, it is usual to provide a voltage-regulating means, such as an induction regulator, in each feeder circuit to compensate for the voltage drop therein and to maintain the desired voltage.

If the several regulators are not similarly operated, a circulating current may flow between the parallel-connected feeder circuits, which increases the losses, and may result in a low voltage on the distribution circuit. The circulating current increases the load on some of the regulators and decreases the load on others, the tendency being for the more heavily loaded regulators to raise the voltage and for the more lightly loaded regulators to lower the voltage. Thus, the regulators which are already overloaded will take a larger share of the total load and the regulators which are underloaded will take a lesser share of the total load. If the impedance of the circuit between the parallel-connected feeders is of a sufficiently low value, the final result will be that the heavily loaded regulators will rotate to the maximum boost position and the lightly loaded regulators will rotate to the maximum buck position.

In order to prevent circulating current between the several feeder circuits connected in parallel, it has been customary to mechanically connect the induction regulators of the several circuits, so that they will operate together. It is frequently undesirable or impossible to do this because of the difficulty of locating the several induction regulators conveniently for mechanical interconnection therebetween. It is desirable, therefore, to provide means for governing the operation of the induction regulators without mechanically connecting them together.

An object of my invention is to provide, in a transmission system of the kind referred to, an improved means for automatically compensating the control of the regulators in accordance with the desired voltage at some point on the system and the division of load on the several feeder circuits without mechanically connecting the regulators together.

Figure 1:
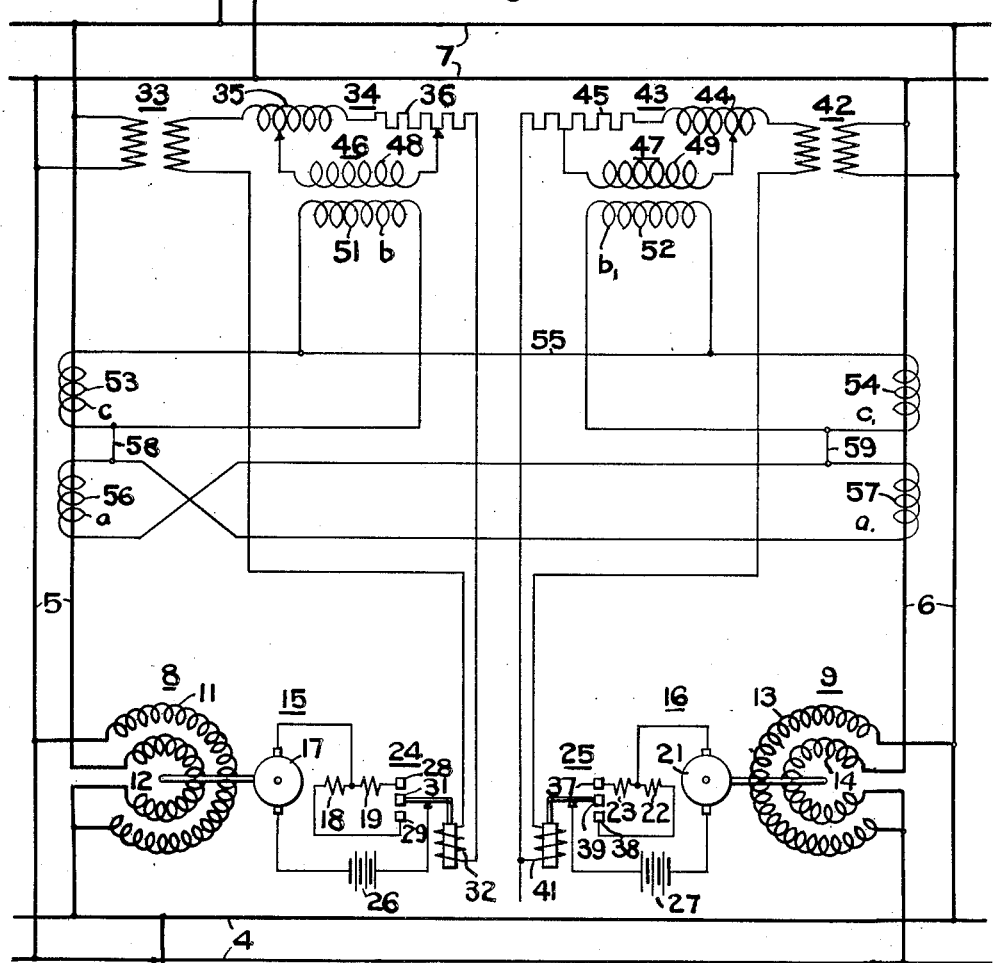
Figure 2:
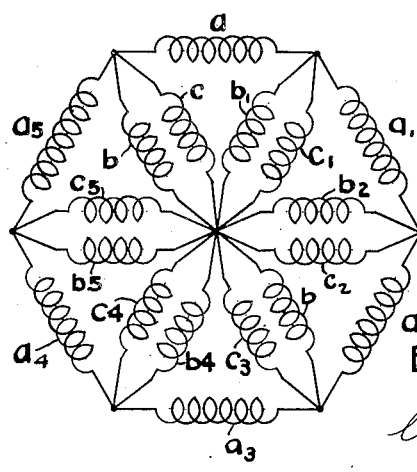

My invention will be better understood by reference to the accompanying drawing, in which Figure 1 represents a diagrammatic view of an embodiment of my invention as applied to the control of two feeder circuits of a single-phase power transmission system, and Fig. 2 illustrates, diagrammatically, the connections between the several transformers for producing the desired compensation in a regulator control circuit applied to any number of feeder circuits.

Referring to the drawing, a source of alternating-current power is represented by an alternator 1 having an armature winding 2 and a field winding 3. The alternator supplies current to the supply mains 4, which is conducted by means of the parallel-connected feeder circuits 5 and 6 to a distribution circuit 7. In order to regulate the voltage of the feeder circuits 5 and 6, induction regulators 8 and 9 are provided and are shown connected to the feeder circuits and comprise primary and secondary windings 11 and 12, and 13 and 14, respectively.

For the purpose of actuating the induction regulators 8 and 9, small pilot motors 15 and 16, respectively, are provided. The motor 15 comprises an armature winding 17, and differentially related series field windings 18 and 19. The motor 16 comprises similarly connected armature and field windings 21, 22 and 23, respectively. Contact-making voltmeters 24 and 25 are provided for effecting the operation of the motors 15 and 16 by connecting them to sources of electric energy, such as batteries 26 and 27, to thereby control the regulators 8 and 9, respectively.

The contact-making voltmeter or relay 24 comprises the fixed contact members 28 and 29 and a movable contact member 31 that is adapted to engage the fixed contact members 28 and 29 and is actuated by an operating winding 32. The relay 25 is similar in construction to the relay 24, comprising the fixed contact members 37 and 38, the movable contact 39 and the operating winding 41.

The motor 15 is caused to rotate in the one or in the other direction upon operation of the relay 24 to close a circuit through the motor-armature winding, one of the differentially related series field windings 18 or 19, one of two fixed contact members 29 or 28, the movable contact member 31 to the battery 26.

The motor 16 is caused to rotate in the one or in the other direction by engagement of the movable contact member 39 of the relay 25 with one of the fixed contact members 37 or 38, thus completing a circuit through the armature winding of the motor and one of the differentially related series field windings 23 and 22, to the battery 27.

The operating winding 32 of the contact-making voltmeter 24 is connected to a voltage transformer 33 that is responsive to the voltage at some predetermined point on the feeder circuit 5. The winding 41 of the contact-making voltmeter 25 is connected to a voltage transformer 42 that is responsive to the voltage at some predetermined point on the feeder circuit 6.

A compensating device 34 is connected between the voltage transformer 33 and the winding 32 to provide for introducing into the control circuit of the contact-making voltmeter a voltage which will compensate the action of the regulator for the line drop in the feeder circuit and for the circulating current between the feeder circuits. The compensating device comprises a reactor 35 and a resistor 36 connected in series-circuit relation. A similar compensating device 43, comprising a reactor 44 and a resistor 45, is connected in circuit between the voltage transformer 42 and the winding 41 of the contact-making voltmeter 25.

Transformers 46 and 47 are provided, having secondary windings 48 and 49, respectively, that are connected between points on the reactor and resistor of the compensating devices 34 and 43, respectively. The transformers 46 and 47 are also provided with primary windings 51 and 52 that are connected, respectively, in parallel-circuit relation, to the secondary winding of current transformers 53 and 54 that are associated with, and responsive to, the current flowing in the feeder circuits 5 and 6, respectively.

The windings 51, 52, 53 and 54 are connected together, at one side, by means of a conductor 55, thus forming a star connection of these several windings. Current transformers 56 and 57 are provided and associated with the feeder circuits 5 and 6, respectively, and have their secondary windings connected in series-circuit relation with each other, and, with the parallel-connected transformer windings of the associated feeder circuit, across the outer points of the star connection by means of conductors 58 and 59.

Fig. 2 of the drawing illustrates the star connection between the transformer windings corresponding to six feeder circuits and the manner of connecting the series transformers between the outer points of the star. For purposes of comparison, the windings 56, 51 and 53 have been lettered A, B and C, respectively, and the windings 57, 52 and 54 have been lettered $A_1$, $B_1$ and $C_1$, respectively, on Fig. 1 of the drawing, and these windings are designated by the same characters on Fig. 2 of the drawing. The windings A, B and C, with subscripts from 2 to 5, represent the corresponding transformer windings associated with four additional parallel-connected feeder circuits, the three letters with the same subscript indicating, in each case, the three transformers associated with a single feeder circuit.

The contact-making voltmeters, or regulating relays, 24 and 25 are actuated in accordance with the voltage of the voltage transformers 33 and 42, respectively, to control the motors 15 and 16 and the regulators 8 and 9 connected thereto, and to maintain the desired voltage in the feeder circuits.

In order to control the regulators 8 and 9 to provide for the voltage drop in the distribution system, the compensating devices 34 and 43 in the circuits energizing the relays 24 and 25, respectively, are so connected that a voltage is introduced into the relay-operating circuits from the current transformers 53 and 54, respectively, causing the regulators to maintain, on the feeder circuits, a voltage above the predetermined value, which corresponds to a balanced condition of the relays 24 and 25. The feeder circuit voltage is increased in accordance with an increase in current flowing in the circuit, so that the desired voltage may be maintained at a predetermined point in the distribution circuit.

The transformer 53, connected in parallel-circuit relation with the transformer 51, will effect compensation of the relay 24 for current flow in the feeder circuit 5 and the transformer 54, having its secondary winding connected in parallel-circuit relation with the primary winding of the transformer 52, will effect compensation of the relay 25 in accordance with the current flowing in the feeder circuit 6.

The series transformers 56 and 57 are so connected that, when the current flowing in the feeder circuit 5 is equal to that flowing in the feeder circuit 6, or has some predetermined relation thereto, the current flowing in the transformer winding 56 will be equal to the current flowing in the transformer winding 57 and this current will flow in the circuit between these transformers. If the current flowing in the feeder circuit 5 increases or decreases with respect to the desired current ratio between the feeder circuits 5 and 6, the current flowing in the windings 56 and 57 will be unequal and will cause current to flow in the one, or in the other, direction in the circuit of the transformer windings 51 and 52 through conductors 58 and 59, and will compensate the relays 24 and 25 in opposite directions. That is to say, the effect of the current flowing from the transformer windings 56 and 57 through the transformer windings 51 and 52 will be such as to increase the voltage of one and decrease the voltage of the other. This compensation will be in such direction that the induction regulator that is taking the larger part of the load will be actuated in a direction to reduce the voltage of its associated feeder circuit, and the regulator which is taking less than its share of the load will be actuated in a direction to increase the voltage of its associated feeder circuit, thus decreasing the current flowing between the feeder circuits and maintaining it at substantially zero.

Many modifications may be made in the circuits and apparatus described without departing from the spirit of my invention, and I do not wish to be limited other than by the scope of the appended claims.

I claim as my invention:

1. In an electrical system, a distribution circuit, a source of alternating current, a plurality of feeder circuits connecting said distribution circuit and said source, a voltage-regulating means connected in each of said feeder circuits, a voltage-responsive means associated with each regulating means and adapted to control the operation thereof, a compensating means connected in circuit with the voltage-responsive means for modifying the action of said voltage-responsive means and provided with a single energizing circuit, means for energizing said circuit to influence said compensating means to compensate the voltage-responsive means for line drop in voltage in the associated feeder circuit, and means for energizing said circuit to influence said compensating means to compensate for a circulating current between the feeder circuits.

2. In an electrical system, a distribution circuit, a source of alternating current, a plurality of feeder circuits connecting said distribution circuit and said source, a voltage-regulating means connected in each of said feeder circuits, a voltage-responsive means associated with each regulating means and adapted to control the operation thereof, a compensating device for modifying the action of said voltage-responsive means comprising a winding, a current transformer energized in accordance with the current flowing in the associated feeder circuit and connected in parallel-circuit relation to said winding, and means responsive to a circulating current flowing between said feeder circuits for influencing said compensating device.

3. In an electrical system, a distribution circuit, a source of alternating current, a plurality of feeder circuits connecting said distribution circuit and said source, a voltage-regulating means connected in each of said feeder circuits, a voltage-responsive means associated with each regulating means and adapted to control the operation thereof, a compensating device for modifying the action of said voltage-responsive means comprising a winding, a current transformer energized in accordance with the current flowing in the associated feeder circuit and connected in parallel-circuit relation to said winding, the several windings and current transformers corresponding to the several feeder circuits being connected in star-circuit relation, and a current transformer associated with each feeder circuit, said several last named current transformers being connected between successive terminal points of said star connection.

4. In an electrical system, a distribution circuit, a source of alternating current, a plurality of feeder circuits connected between said distribution circuit and said source, a voltage-regulating means connected in each of said feeder circuits, a contact-making voltmeter associated with each regulator for controlling the operation thereof, means for impressing upon the windings of said voltmeter voltages which vary in accordance with the variations in the voltage at a predetermined point on said distribution circuit, a compensating device including a reactance in the circuit of the operating winding of each of said voltmeters, means responsive to the current flowing in the associated feeder circuit and means responsive to the circulating current flowing between said feeder circuits for producing voltage drops across said reactances and thereby modify the voltages imposed upon the windings of said voltmeters.

5. In an electrical system, a distribution circuit, a source of alternating current, a plurality of feeder circuits connected between said distribution circuit and said source, a voltage-regulating means connected in each of said feeder circuits, a contact-making voltmeter associated with each regulator for controlling the operation thereof, means for impressing upon the windings of said voltmeter voltages which vary in accordance with the varitions in the voltage at a predetermined point on said distribution circuit, a compensating device in the circuit of the operating winding of each of said voltmeters, means comprising a pilot circuit for producing a voltage drop across said compensating device to modify the voltage imposed upon the windings of said voltmeter, and means for introducing into said pilot circuit a current that is a measure of the current flowing in the associated feeder circuit and of the current flowing between the feeder circuits.

6. In an electrical system, a distribution circuit, a source of alternating current, a plurality of feeder circuits connected between said distribution circuit and said source, a voltage-regulating means connected in each of said feeder circuits, a contact-making voltmeter associated with each regulator for controlling the operation thereof, means for impressing upon the windings of said voltmeter voltages which vary in accordance with the variations in the voltage at a predetermined point on said distribution circuit, a compensating device in the circuit of the operating winding of each of said voltmeters, a transformer associated with each compensating device and having its secondary winding connected thereto, and two current transformers associated with each feeder circuit, the secondary winding of one of said current transformers being connected in parallel-circuit relation to the primary winding of said first mentioned transformer, the secondary winding of the other of said two transformers being connected in series-circuit relation with the primary winding of said first mentioned transformer and in series-circuit relation with the secondary windings of the corresponding transformers associated with the other feeder circuits.

In testimony whereof, I have hereunto subscribed my name this 14th day of February, 1928.

EDWARD R. WOLFERT.